UNITED STATES PATENT OFFICE 2,600,606

WATER-SOLUBLE DERIVATIVES OF UNSULFONATED LIGNIN

Walter Jean Balon, Carneys Point, N. J., assignor to E. I. du Pont de Nemours and Company, Wilmington, Del., a corporation of Delaware No Drawing. Application May 25, 1950, Serial No. 164,291

8 Claims. (Cl. 260—124)

This invention relates to novel organic compounds. More particularly, this invention deals with novel, water-soluble derivatives of lignin, useful as tanning agents.

Hides and skins have been tanned with a variety of vegetable extracts such as quebracho, chestnut, hemlock, divi-divi, oak, spruce, sumac, etc. Some of these extracts are imported and at times become scarce and high priced. A number of efforts have been made to provide a domestic source of tanning materials both by growing suitable shrubs and trees from which tanning extracts may be obtained and by converting other raw materials into tanning agents. One of the cheapest and most plentiful raw materials considered is lignin. This is readily available as a by-product in paper manufacture and also in the utilization of farm products.

However, the application of lignin to the problem of tanning has not been developed to date to a commercially successful stage. Lignin itself is insoluble in water except under highly alkaline conditions. To be applicable as a tanning material, a water-soluble derivative thereof must be employed. Hitherto, the only water-soluble form of lignin available on a commercial scale has been the sulfonic acids thereof obtainable as by-products in the paper industry by the sulfite-pulp process. These, however, do not produce a tanning effect of sufficiently good quality to replace the aforementioned extracts. Furthermore, the vast supply of unsulfonated lignin, obtainable as by-product in the sulfate and soda-pulp processes of paper making and in the working-up of many agricultural residues such as corn cobs, flax shives, oat hulls, cottonseed hulls and bagasse, has remained hitherto virtually untapped.

Now according to this invention water-soluble derivatives of lignin, of excellent tanning qualities are obtained by reacting lignin with boric acid and phenols, preferably polyphenols, followed by neutralization with an alkali, such as sodium hydroxide.

The reaction product may be isolated as an alkali-metal salt or in the form of free acid. The former is soluble directly in water; the acid form becomes soluble in water upon the addition of alkali. The reaction product may also be made to dissolve in an acidified aqueous bath by adding to the latter water miscible solvents, such as ethyl alcohol, acetone, etc. Additional solubility properties, more especially solubility in an acid bath, may be bestowed upon the reaction product by reacting the same in aqueous medium with dilute sodium bisulfite, sulfuric acid or phosphoric acid. In this latter reaction, it is believed, some sulfonic acid, sulfate or phosphate groups are entered into the molecule, imparting to the same solubility in water on the acid side.

The structure of lignin has not been determined definitely to date. Furthermore, its composition often varies with the source employed and with other factors affecting its formation. The recent trend in science is to regard lignin as a polymer based upon a complicated fundamental unit of molecular weight of about 800–1000. This unit is often referred to as the lignin molecule, and will be so employed hereinbelow.

The lignin molecule has been determined to contain aromatic nuclei and furane or pyrane rings. It is also known to bear a relatively large number of methoxy groups and a smaller number of hydroxy groups, of alcoholic and phenolic natures.

It is clear that the reaction which takes place according to my invention cannot very well be formulated by means of an accurate equation.

Where a polyhydric phenol is employed for condensation, some of the phenolic OH groups appear to remain unattacked, contributing to the tanning qualities of the compound. For this reason, I consider the selection of a polyphenol, such as resorcinol, hydroquinone, phloroglucinol, etc., a preferred embodiment of my invention.

For the sake of further illustration, and without limiting my invention thereby, I give hereinbelow a few typical examples of my mode of procedure. Parts mentioned are by weight.

Example 1.—Lignin-resorcinol-borate 84 parts by weight of alkali lignin and 200 parts of resorcinol were intimately mixed and heated together for a short period to a temperature of 95°–100° C. until a clear melt was obtained. 124 parts of boric acid were then added in small portions over a period of 15 minutes at a temperature of 110°–118° C. The reaction mass was then heated in 30 minutes to 146° C. and maintained at this temperature for 2 hours more. The reaction was held under reflux at this temperature due to the formation of water of reaction. The clear, brown, fluid reaction mass was then dissolved in 2600 parts of water by making it strongly alkaline with 370 parts of 30% sodium hydroxide solution at room temperature, filtered and acidified with sulfuric acid to Congo red paper, to precipitate the product.

The filtered product was washed well with water and dried at 60° C.

The product was a light brown powder, very soluble in dioxane, acetone, Cellosolve, dilute alkalies and diluted alcohol-water solution. The product contained 3.32% boron and 8.61% methoxyl, as compared with 0 and 12.15%, respectively, for the lignin itself. When tested as a tanning agent on sheepskin by the method of Example 8 hereinbelow, it gave a leather possessing good fullness, feel and appearance and having a shrink-temperature of 75°–78° C.

Example 2.—Lignin-phenol-borate

In a manner similar to that described in Example 1, 124 parts by weight of boric acid were added over a period of 15 minutes to a melt consisting of 84 parts of alkali lignin and 200 parts of phenol at a temperature of 105°–110° C. The reaction mass was slowly heated in 30 minutes to 145°–150° C. and maintained at this temperature for 2 hours. The reaction mass was fluid at this temperature and refluxed because of the water liberated from the reaction. The clear brown fluid melt after cooling to 90° C. was drowned in 2600 parts of water and made alkaline with 370 parts of 30% sodium hydroxide solution at 24°–34° C. After stirring at room temperature for 2 hours the alkaline extract was filtered from a substantial amount of insoluble material. The alkaline extract on acidification with concentrated hydrochloric acid gave a tarry product which was steam distilled to free it of phenol. The residual product, after filtering, washing and drying at 60° C., was obtained as a light brown powder, which was easily soluble in dioxane, alcohol, Cellosolve and weak aqueous alkali. As in the case of corresponding resorcinol composition, boron and methoxy contents indicated definitely that reaction had occurred.

Pickled sheepskin, on being vegetable tanned with a tanning solution of this compound as in Example 8 hereinbelow, had a shrink temperature of 66° C. It possessed very good all around leather feel, appearance, fullness, body strength and smooth grain finish.

Example 3.—Lignin-boric acid-diphenylol propane 42 parts of alkali lignin and 23 parts of 4,4'-dihydroxy diphenyl-2,2-propane were mixed with 13 parts of boric acid and heated on an oil bath at 180° C. for 3 hours while stirring. To the cooled product, 700 parts of water and 330 parts of 30% sodium hydroxide were added. The resulting solution was filtered and then acidified to Congo red with sulfuric acid. The insoluble precipitate which formed was filtered off, washed with water until neutral and dried. A light brown powder was obtained, which was soluble in weak alkali and in dilute alcohol.

Sheepskin tanned with the compound in the manner described in Examples 8 and 9 hereinbelow gave a firm, pliable leather with a shrink temperature of 57° C.

Example 4.—Lignin-boric acid-diphenylol-sulfone 42 parts of lignin, 15 parts of 4,4'-dihydroxy diphenyl sulfone and 6.2 parts of boric acid were put in 250 parts of dioxane and heated at 100°–105° C. overnight, yielding a clear solution. The dioxane was then distilled off at 110° C. The residue was taken up in benzene and heated to distil off the benzene. The residue was dissolved in 1500 parts of water by adding 240 parts of 30% sodium hydroxide and stirring for 3 hours. It was then filtered to remove some insoluble material. The filtrate was made acid to Congo red paper with sulfuric acid. The precipitate so formed was filtered off, washed acid-free and dried.

Pickled sheepskin tanned with this product gave a soft leather of good tear strength and a shrink temperature of 58° C.

Example 5.—Using dioxane as solvent 42 parts of lignin, 24 parts of resorcinol and 17 parts of boric acid were refluxed in 300 parts of dioxane at 105° C. for six hours. The dioxane was then distilled off and the melt was heated at 180° C. for 2 hours. The mass became quite viscous. The solid obtained on cooling to room temperature, was ground to a brown powder. As in the previous examples, the product constituted an excellent tanning agent.

Example 6.—Using a closed vessel 26 parts of hardwood lignin, 17 parts of resorcinol and 15 parts of boric acid were intimately mixed and heated in a stainless steel bomb at 180° C. for 10 hours. The bomb was cooled and 52 parts of a viscous brown mass were obtained. The product was soluble in alcohol, dioxane and slightly alkaline solutions.

Sheepskin tanned with this product as in Example 9 hereinbelow was firm, pliable and of moderate fullness. It had a shrink temperature of 65° C.

Example 7.—Bisulfite treatment 26 parts of the lignin-resorcinol-borate condensation of Example 1 were dissolved in 100 parts of water and 52 parts of 30% sodium hydroxide solution. 30 parts of sodium bisulfite were added and the solution was stirred at reflux temperature for 12 hours. It was then cooled to room temperature, acidified with concentrated HCl, heated to a boil to expel $SO_2$, and filtered to remove a small amount of insoluble material. When applied to sheepskin according to Example 10 hereinbelow, a good leather was obtained, having a shrink temperature of 65° C.

In the following additional examples I indicate the modes of tanning employed by me in testing the hereinabove products. But it will be understood that my invention is not limited to any special mode of tanning and that other procedures well known to those skilled in the art may be applied.

Example 8

A tanning solution from the product of Example 1 was prepared as follows:

| | Parts |
|---|---|
| Lignin-resorcinol-borate | 50 |
| Alcohol, 95% | 260 |
| An alkane-sulfonate dispersing agent | 60 |
| Water | 130 |

The lignin-resorcinol-borate was first dissolved in the alcohol by warming to 50° C. and then the alkane-sulfonate dispersing agent and water were added to give a clear solution of the tanning agent. The pH of this solution was adjusted to 4.0–4.5 by adding sulfuric acid. Pickled sheepskin, on vegetable tanning with this solution for 6 hours in a tumbler, had a shrink temperature of 77.5° C. In a similar manner cowhide, on being tanned with this solution had a shrink temperature of 75° C.

The resultant leather was tough and durable and less water-sensitive than corresponding quebracho tanned skins. In contrast to a quebracho tanned skin, the new tanning agent gave a much better penetration, with less grain puckering. The resultant leather possessed good fullness and in general had a very good all around leather feel and appearance.

*Example 9*

2.5 g. of the powder obtained in Example 5 were dissolved in 60 g. of water by adding about 1 g. of 30% sodium hydroxide solution. The pH of the resultant solution was adjusted to 8.5 by the addition of about 5 g. of 10% formic acid solution. The resulting colloidal solution was used to tan sheepskin as follows:

A piece of wet pickled sheepskin, 3 x 3 inches weighing 5.1 g., was tumbled with 30 g. of water containing 5 g. of sodium chloride for 20 minutes. The above tanning extract was added in four equal portions, tumbling for 30 minutes after each of the first 3 additions and then tumbled for 6 hours. The pH of the tanning liquor at this point was 7.7. The pH was then adjusted to 3.5 with 10% formic acid and tumbling was continued for 1 hour. The skin was then rinsed and dried. It had a shrink temperature of 62° C. The leather was firm, pliable and had a good tear strength.

*Example 10*

45 g. of the solution obtained in Example 7, containing 3 g. of the solubilized condensation product, was adjusted to a pH of 4.4 with sodium hydroxide and used as a tanning liquor.

A 3 x 3 inch piece of pickled sheepskin weighing 5 g. was tumbled with 30 g. of water and 5 g. of salt for 20 minutes. The above tanning liquor was then added in four equal increments, tumbling 30 minutes after each of the first 3 additions and 6 hours after the last. It was noted that the salt did not cause any precipitation in the tanning liquor. The pH of the tanning liquor was 4.5 at the end of the tanning. The tanned skin was removed, rinsed and dried. It was firm, pliable and moderately full with a shrink temperature of 65° C.

It will be understood that the above procedures are susceptible of wide variation within the spirit of this invention. Thus, in lieu of resorcinol in Example 1, a corresponding quantity of orcinol, hydroquinone, pyrocatechol, pyrogallol, phloroglucinol or hexahydroxy-benzene may be employed. In lieu of phenol in Example 2, a corresponding quantity of cresol, carvacrol or thymol may be employed. Methoxy groups in the benzene ring likewise react with the boric acid molecule; therefore, methoxy-substituted benzenes such as guaiacol and veratrole may also be employed. Various other substitution derivatives may likewise be employed, as illustrated by pyrogallol, m-hydroxybenzaldehyde, salicyclic acid, 2,7-dihydroxy naphthalene, cresol, xylenol, beta-hydroxy-3-naphthoic acid, 4,4'-diphenylol-2,2-propane, 4,4'-diphenylol sulfone, bis(3,3'-chloro-4,4'-phenylol)-2,2-propane and bis(2-hydroxy-3,5-dichlorophenyl) methane. The last-mentioned chlorinated phenols are of special interest because of their fungicidal properties; it is expected that by the use of the resulting tanning agent, fungus resistant leathers may be developed. About the only important limitation on the phenolic compound to be chosen is that is that it be free of basic radicals such as amino and that it should melt at the reaction temperature or be soluble in an inert solvent which is liquid at the reaction temperature.

In lieu of boric acid a salt thereof may be employed, for instance borax, sodium tetraborate or sodium metaborate.

In lieu of sodium hydroxide, potassium hydroxide, ammonium hydroxide, soda ash or other convenient alkalis may be employed for neutralizing the reaction product.

The reaction may be carried in a solvent, for instance dioxane. In such cases, the molar proportions of the phenol and boric acid with respect to the lignin should be at least 1:1:1 and preferably 2:4:1, the unit of M. W. 800–1000 being considered for this purpose as 1 mole of lignin. On the other hand, an excess of the phenolic agent may be employed to serve as a flux, in which event the quantity of boric acid should preferably likewise be in excess, and preferably stoichiometric with respect to the phenol, so as to avoid consuming all of the boron-OH groups by esterification.

The temperature of the reaction may be anywhere from 100° C. to the reflux temperature of the mass or even up to 250° C. if a sealed vessel is employed.

The alkane-sulfonate dispersing agent employed in Example 8 was the product of Example 3 of U. S. P. 2,197,800. But any other common, non-corrosive wetting or dispersing agent may be used in its place, or it may be omitted altogether. Likewise, the function of the alcohol in the same Example 8, is to assist in dissolving the lignin-borate-phenolic product, thereby accelerating the tanning process, but it may be replaced by any other water-miscible inert solvent, for instance acetone.

Also, as shown in Example 7, the product may be rendered soluble in aqueous liquors of low pH by treatment with sodium bisulfite. Such solubilization may also be achieved by treatment with phosphoric or sulfuric acid. The advantage of this added solubilization step is that it eliminates the necessity of using an auxiliary agent to get solution in the lower pH range where vegetable tanning is normally carried out.

For evaluating the quality of the leather produced, I have employed hereinabove the shrink temperature method. It is a measure of the degree of tanning, depending on resistance to the action of hot water. The leather is placed in cold water which is heated gradually, and the shrink temperature is that at which the leather suddenly begins to shrink. A value over 50° C. is considered to indicate that a significant amount of tannage has been produced.

The lignin employed in the above examples was of the type caled "alkali lignin," obtained from the black liquor arising in the soda-pulping of wood. It is a brown powder; insoluble in water, but soluble in strong alkali. However, it is not necessary to start with "alkali lignin." For instance, partially demethoxylated lignin may be used. Likewise, partially oxidized lignins or so-called degraded lignins, for instance the product of U. S. P. 2,482,594, may be employed.

The products of this invention have the advantage over the natural vegetable extracts in that they are prepared from readily available materials and are not dependent on imports at varying price levels. Being manufactured chemicals they are also susceptible to close control of quality and need not vary in tanning strength from batch to batch as natural materials do. They may be used to tan various types of leathers such as soft garment leathers, side leather for shoe uppers or sole leather, belting leather, etc. The lignin derivatives may be used as a retan after conventional chrome tanning or after tanning with other synthetic tanning agents such as aliphatic sulfonyl chlorides. They may also be used in admixture with the normal vegetable extracts commonly used as tanning agents.

I claim as my invention:

1. Water-soluble derivatives of lignin, being the compounds obtained by reacting lignin with boric acid and a phenol in quantities not less than 1 mole of each of the latter two to 1 mole of lignin (the latter being considered as having a molecular weight of between 800 and 1000), and alkalizing the reaction product.

2. Compounds as in claim 1, the phenol employed containing at least two hydroxy groups.

3. Compounds as in claim 2, the proportions of the reagents being substantially 4 moles of boric acid and 2 moles of the phenolic compound to 1 mole of lignin.

4. Water-soluble derivatives of lignin, being the compounds obtained by reacting 800 parts by weight of lignin with not less than 248 parts of boric acid and not less than 220 parts of resorcinol, and neutralizing the reaction product with alkali.

5. The process of producing a water-soluble derivative of lignin, useful as a tanning agent, which comprises reacting lignin with boric acid and a phenol in quantities not less than 1 mole of each of the latter two to 1 mole of lignin (the latter being considered as having a molecular weight of between 800 and 1000), and alkalizing the reaction product.

6. A process as in claim 5, the reaction being carried out in an inert organic solvent.

7. A process as in claim 5, the phenol and boric acid being employed in excess, to provide a flux for the reaction.

8. A process as in claim 7, reaction being effected by heating together the three ingredients to produce a melt, and further heating the melt at temperatures between its melting temperature and reflux temperature.

WALTER JEAN BALON.

REFERENCES CITED

The following references are of record in the file of this patent:

UNITED STATES PATENTS

| Number | Name | Date |
|---|---|---|
| 2,148,893 | Bauer | Feb. 28, 1939 |
| 2,184,622 | Mauthe et al. | Dec. 26, 1939 |

OTHER REFERENCES

Chemical Abstracts, May 25, 1949 (column 4042), citing Belgian Patent No. 475,471 of September 1947.